(12) United States Patent
Bristol et al.

(10) Patent No.: US 8,682,997 B2
(45) Date of Patent: *Mar. 25, 2014

(54) REMOTE ACCESS AND SOCIAL NETWORKING USING PRESENCE-BASED APPLICATIONS

(75) Inventors: Anthony R Bristol, Issaquah, WA (US); Todd S. Biggs, Kirkland, WA (US); Campbell D. Gunn, Redmond, WA (US); Tiffany L Shockley, Los Gatos, CA (US)

(73) Assignee: Microsoft Corporation, Redmond, WA (US)

( * ) Notice: Subject to any disclaimer, the term of this patent is extended or adjusted under 35 U.S.C. 154(b) by 127 days.

This patent is subject to a terminal disclaimer.

(21) Appl. No.: 12/957,269

(22) Filed: Nov. 30, 2010

(65) Prior Publication Data

US 2011/0078228 A1    Mar. 31, 2011

Related U.S. Application Data

(62) Division of application No. 11/275,442, filed on Jan. 3, 2006, now Pat. No. 7,853,661.

(51) Int. Cl.
    *G06F 15/16*    (2006.01)
(52) U.S. Cl.
    USPC ........... 709/207; 709/208; 709/202; 709/206; 709/204

(58) Field of Classification Search
    USPC .......................................... 709/207
    See application file for complete search history.

(56) References Cited

U.S. PATENT DOCUMENTS

| | | | |
|---|---|---|---|
| 6,351,762 B1 | 2/2002 | Ludwig et al. | |
| 2004/0215723 A1 | 10/2004 | Chadha | |
| 2005/0102362 A1 | 5/2005 | Price et al. | |
| 2006/0109854 A1* | 5/2006 | Cancel | 370/401 |
| 2006/0218226 A1* | 9/2006 | Johnson et al. | 709/202 |
| 2006/0272014 A1* | 11/2006 | McRae et al. | 726/12 |

FOREIGN PATENT DOCUMENTS

EP    1225763 A1    7/2002

* cited by examiner

*Primary Examiner* — Shripal Khajuria
(74) *Attorney, Agent, or Firm* — Lee & Hayes, PLLC

(57) ABSTRACT

Various embodiments utilize a real-time instant messaging or presence based communications system as a mechanism to remotely control the operation, programming, and/or review of media content on a device or system such as a television, media center, gaming device, digital video recorder and the like. In addition, the use of the instant messaging or presence based communication system opens up various social networking options for users. For example, users can, if allowed, gain access to the viewing habits of individuals in their contact list and exchange information with one another to provide a rich, robust sharing environment.

18 Claims, 5 Drawing Sheets

REMOTE ACCESS AND SOCIAL NETWORKING USING PRESENCE-BASED APPLICATIONS

CROSS-REFERENCE TO RELATED APPLICATIONS

This application is a continuation of and claims priority from U.S. patent application Ser. No. 11/275,442, titled "Remote Access and Social Networking Using Presence-Based Applications", filed on Jan. 3, 2006, which is herein incorporated by reference.

BACKGROUND

Today, a person who wants to interact with a device that consumes media, such as a television or entertainment system that plays programs and movies or, a gaming device (among other devices), typically needs to be present at the device to manage, review, view the programming or otherwise interact with the device.

SUMMARY

Various embodiments utilize a real-time instant messaging or presence based communications system as a mechanism to remotely control the operation, programming, and/or review of media content on a device or system such as a television, media center, gaming device, digital video recorder and the like.

In addition, the use of the instant messaging or presence based communication system opens up various social networking options for users. For example, users can, if allowed, gain access to the viewing habits of individuals in their contact list and exchange information with one another to provide a rich, robust sharing environment.

DETAILED DESCRIPTION

Overview

Figure 1:
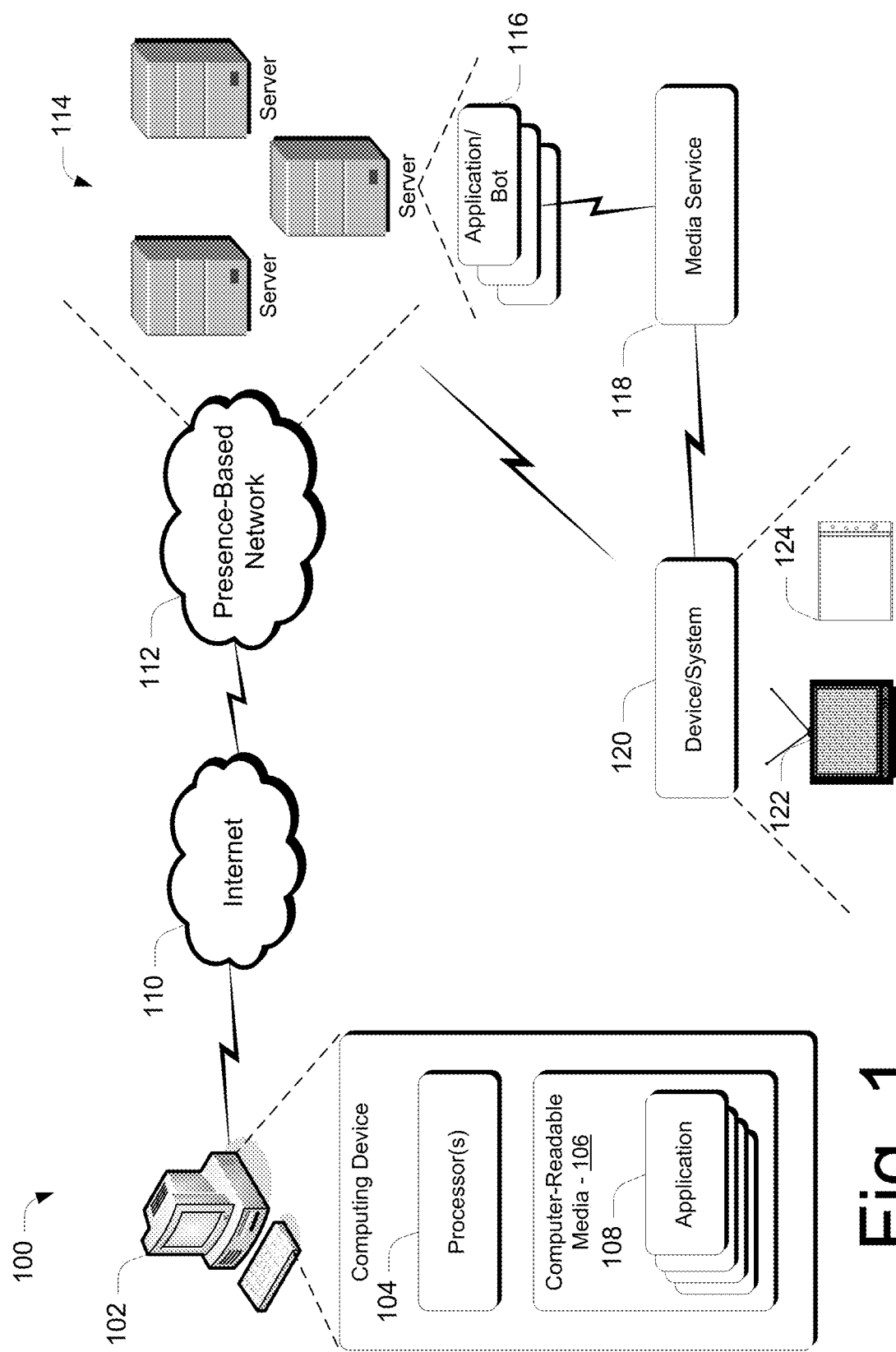
FIG. 1 illustrates a system that includes a presence-based network in accordance with one embodiment.

Various embodiments utilize a real-time instant messaging or presence based communications system as a mechanism to remotely control the operation, programming, and/or review of media content on a device or system such as a television, media center, gaming device, digital video recorder and the like.

In addition, the use of the instant messaging or presence based communication system opens up various social networking options for users. For example, users can, if allowed, gain access to the viewing habits of individuals in their contact list and exchange information with one another to provide a rich, robust sharing environment.

Using a real-time instant messaging or presence-based network, such as a Voice Over IP (VoIP) or voice clip network to manage the process described below provides a unique capability as a person or user can interact with an application or BOT (short for "robot") on the network to access, interact with, and/or program their device. In contexts where the device resides in the form of a media center or television, such interaction can allow a user to record programs, review programs that have been recorded, interact with the application or BOT to receive recommendations for programs to view based on the programs that they have recorded, reviewed, or asked questions about, and receive notifications about new programming that the system determines or the user has indicated would be of interest to them.

In the discussion that follows, the notion of a presence based network is first discussed to provide the reader who is unfamiliar with such networks some context for appreciating the described embodiments. Following this, a discussion of the inventive embodiments in the context of a presence based network is provided.

Presence in General

The notion of presence typically implies the use of a server or service that runs and keeps online users updated with each other's contacts' online status. That is, in a presence based network, users can identify so-called contacts—the same or similar to those that appear in the user's email address list. Whenever a contact is online, the presence based network notifies the user so that the user can leverage the services provided by the network—such as instant messaging, peer-to-peer file exchange and the like. That is, the presence based network can enable contacts that are online together to communicate in a real-time fashion.

One commercially-available software product that provides presence capabilities is MSN Messenger, although other products are available. MSN Messenger is a rich, integrated real-time communications experience in Windows® XP that enables people to effortlessly see, talk, work and play with friends, family and colleagues, whenever and however they choose using their personal computer. MSN Messenger also includes presence and notification features to keep users updated when their contacts are online and let users know their current status.

Various embodiments described below can leverage the functionality provided by a presence-based network. It is to be appreciated and understood that MSN Messenger constitutes but one exemplary application that can be utilized in this context. As such, other applications can be utilized without departing from the spirit and scope of the claimed subject matter.

Exemplary Presence-Based Network

As an example of a presence-based network in accordance with one embodiment, consider FIG. 1 which illustrates such a network or system generally at 100. System 100 includes one or more computing devices 102 each of which includes one or more processors 104, one or more computer-readable media 106 and one or more applications 108 that reside on the computer-readable media and which are executable by the processor(s). In at least one embodiment, one of the applications resides in the form of an instant messaging application, such as MSN Messenger.

Although computing device 102 is illustrated in the form of a desktop computer, it is to be appreciated and understood that other computing devices can be utilized without departing from the spirit and scope of the claimed subject matter. For example, other computing devices can include, by way of example and not limitation, portable computers, handheld computers such as personal digital assistants (PDAs), cell phones and the like.

System 100 also includes a network, such as the Internet 110 that is used by computing device 102 to communicate with a presence-based network 112. Any suitable protocols can be utilized to enable communication between computing device 102 and presence based network 112.

As shown, presence-based network 112 includes one or more servers 114 that implement the presence environment, as will be appreciated by the skilled artisan. The presence-based network can be one that includes or supports the use of instant messaging, VoIP, voice clips and the like—all of which can permit a user of computing device 102 to communicate with the network. Instant messaging, VoIP and voice clip protocols will be understood by the skilled artisan and, for the sake of brevity, are not further described here.

In at least some embodiments, the presence-based network includes one or more applications or bots 116, typically hosted by or on a server 114, which communicate with a user of computing device 102 (through any suitable means such as instant messaging, VoIP, voice clips and the like), as well as with a media service 118 that provides access to various media, such as television programs, online games and the like. An example of such as media service is one that is provided by MSN TV, as will be appreciated by the skilled artisan. Media service 118 can either host or have access to an electronic program guide service that exposes program guide data which can be used by the user to make programming decisions.

In addition, system 100 includes one or more device/systems 120 on which media provided by media service 118 can be consumed by the user. Examples of such devices/systems include by way of example and not limitation televisions 122, game devices 124, as well as other devices such as computing devices, digital video recorders (DVRs), mobile phones, personal media device (for showing videos or listening to music, and personal computers running, for example, Windows® Media Center.

In at least some embodiments, media service 118 maintains data that pertains to many individual users' consumption of media content. This data can include, by way of example and not limitation, data that pertains to user viewing habits (such as programs that a user watches), user or service ratings information, user profiles (such as programs, actors, or characteristics of programs that the user find desirable), and the like.

In operation, application or bot 116 is, in one embodiment, an advocate for a user's television habits. That is, bot 116 can make recommendations to the user and can provide the user with remote access to their device or system 120 (via computing device 102) so that the user can interact with or otherwise control their device or system. In addition, as described below in more detail, in at least some embodiments, bot 116 understands what a user's contacts are viewing, what the contacts have recorded and the like, and can thus provide a social networking experience that enables a rich and robust sharing interaction among users.

As such, the bot serves as a conduit of information that projects information based on a user's likes and dislikes. The bot is able to provide and support these features, as well as others, by leveraging the use of the presence-based network. More specifically, in at least one embodiment, the bot is programmed or otherwise configured in a manner that allows the user to have a conversation with the bot using a human-like communication channel. Such human-like communication channel can reside in the form of an instant messaging channel that permits textual conversation to be exchanged. Alternately or additionally, this communication channel can reside in the form of a real time communication channel that supports VoIP or voice clips, as will be appreciated by the skilled artisan.

In embodiments that utilize an instant messaging channel to enable a user to engage bot 116, bot 116 resides in the form of a contact that can be added to the user's contact list. In one embodiment, a contact list is a list of users on the presence based network for which a particular user views and publishes their presence. For example, bot 116 might have a name such as TVBuddy@microsoft.com such that the bot can be added to the user's contact list. Once added to the user's contact list, any time that the user is online, they can engage the bot if the bot is online as well. Typically, bot 116 will most likely always be online.

Figure 2:
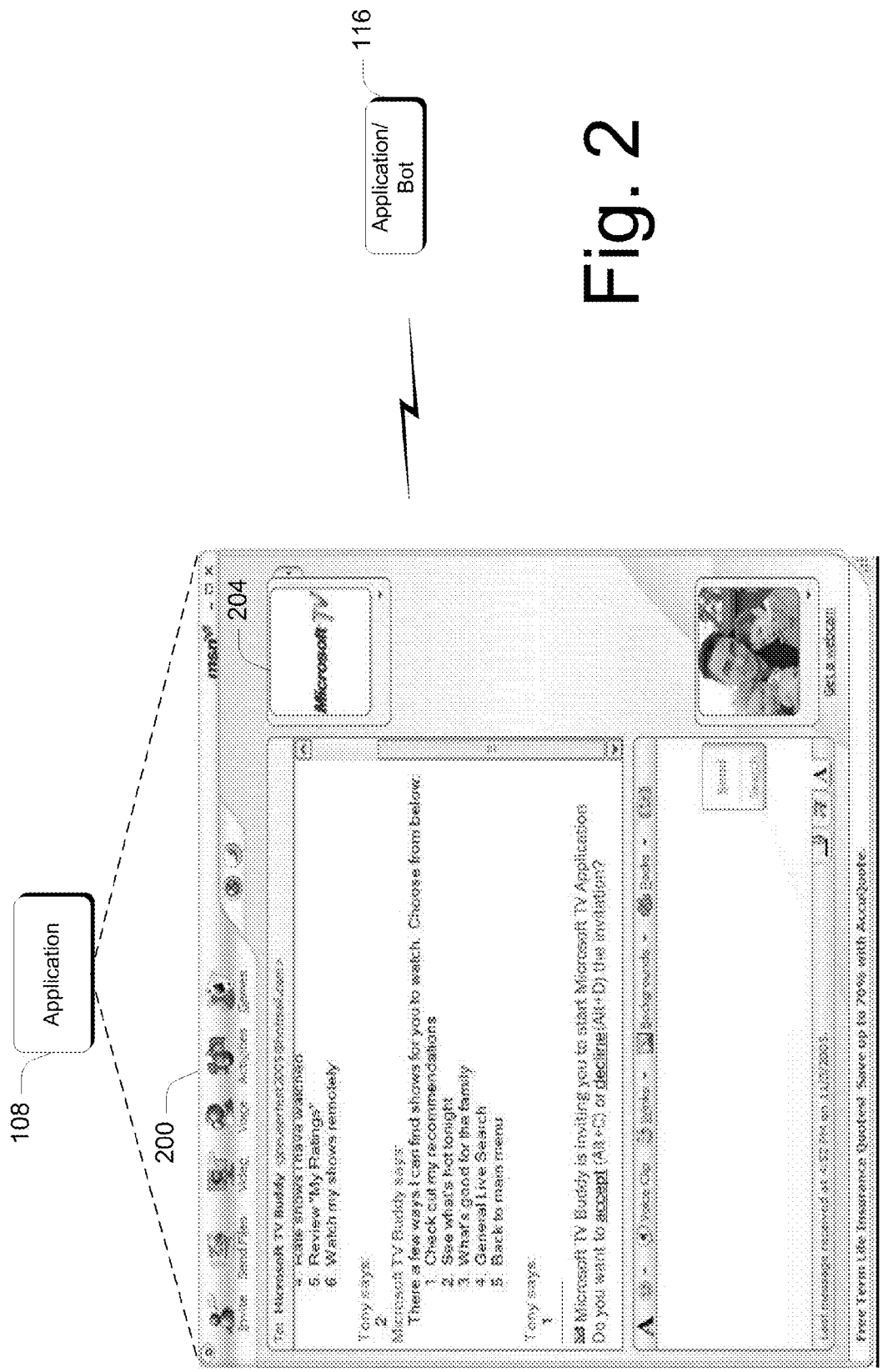
FIG. 2 illustrates an exemplary application in the form of an instant messaging application that exposes a conversation window, and an application/bot in accordance with one embodiment.

As an example, consider FIG. 2 which illustrates, from FIG. 1, an application 108 in the form of an instant messaging application and one application/bot 116. Here, instant messaging application 108 presents, on a user's remote computing device, a so-called conversation window 200 which permits the user to have conversations with various contacts that are online. Notice here that a contact 204 is included in their contact list and corresponds to application/bot 116. Notice also in the conversation window 200 that the user is currently textually engaging the bot (and vice versa). Here, the bot 116 is asking the user to select a way for the bot to find shows for the user to watch. In this instance, user Tony has selected "1" and thus the bot will now use Tony's recommendations to find a show to watch. In this particular example, bot 116 can leverage the data that is maintained by media service 118 (FIG. 1) to come back with a meaningful selection for Tony. In this manner, the user can interact with bot 116 to remotely program, review, or receive recommendations about programming.

In at least some embodiments, bot 116 can be configured to generate various alerts for a user. For example, alerts can be opt-in notifications about user specified content of interest, with end-points that include an instant messaging application, an e-mail application and mobile devices (via SMS). Alerts can be generated on any content or trigger event. In at least some embodiments, alerts can be generated by a system through web service API's which can be hosted as part of the instant messaging network, an example of which is discussed below.

Figure 3:
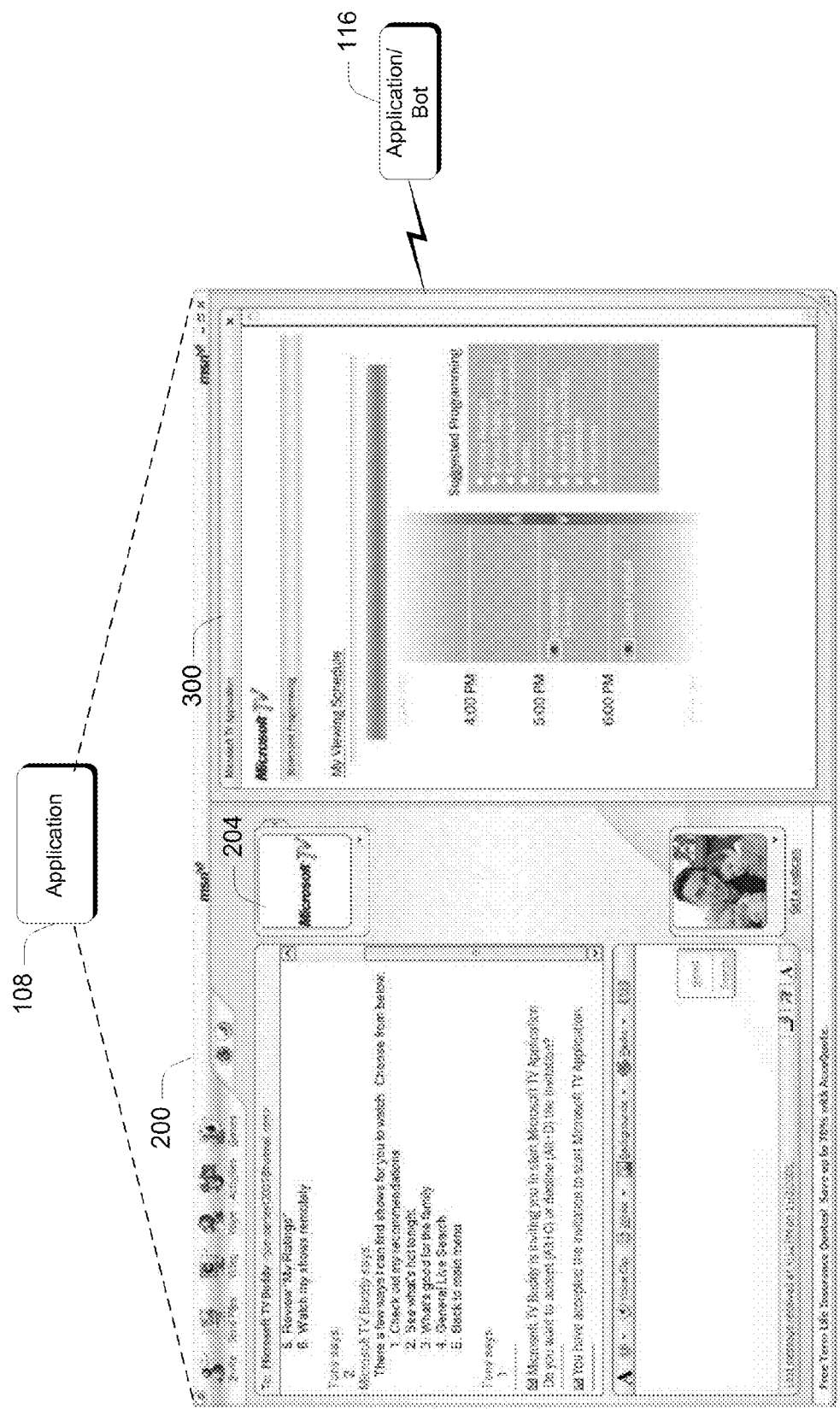
FIG. 3 illustrates FIG. 2's conversation window, along with an activity window that has been opened for a user in accordance with one embodiment.

In at least some embodiments, bot 116 can cause an activity window to be opened on the user's computing device to enable the user to more meaningfully remotely view and make selections. As an example, consider FIG. 3 which shows FIG. 2's conversation window 200, along with an activity window 300 that has been opened for the user. Notice here that the bot 116 is prompting the user to review the available programming to program a device (such as devices 122, 124 in FIG. 1). Activity window 300 displays the programming available based on time, user preferences and the like. Notice also that the user is interacting with bot 116 via both conversation window 200 and with activity window 300. For example, the user has opted, via activity window 300, to record two programs. The user of an activity window constitutes but one example of how a bot and an application can interact. Other types of interactions can be utilized without departing from the spirit and scope of the claimed subject matter.

Exemplary Method

Figure 4:
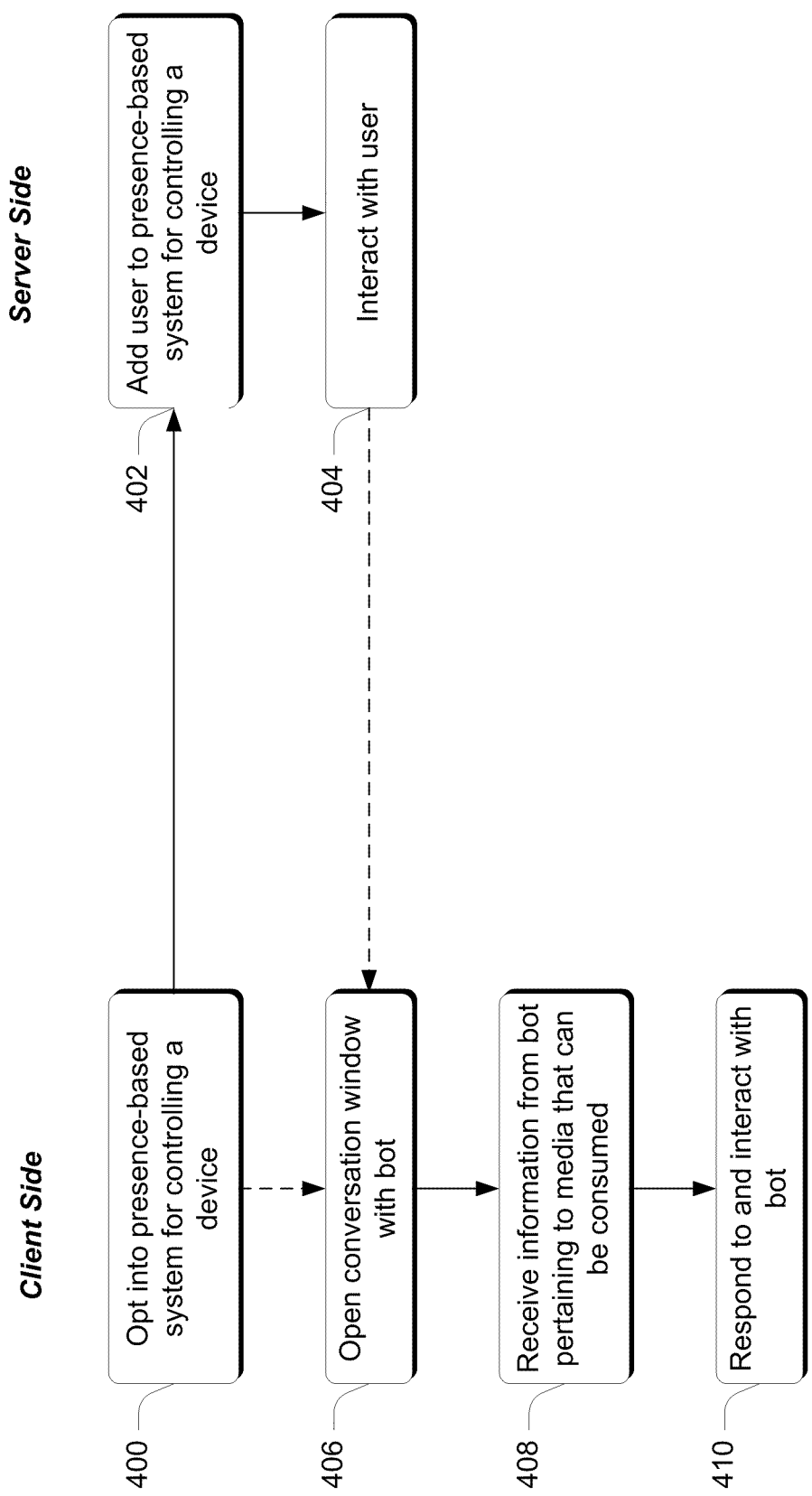
FIG. 4 is a flow diagram that describes steps in a method in accordance with one embodiment.

FIG. 4 is a flow diagram that describes steps in a method in accordance with one embodiment. The method can be implemented in connection with any suitable hardware, software, firmware or combination thereof. In but one embodiment, aspects of the method can be implemented by components of a client-side application, such as an instant messaging application; and, aspects of the method can be implemented by a server-side application or bot. But one example of such a bot is given above and below. It is to be understood that other applications can be utilized without departing from the spirit and scope of the claimed subject matter.

In the discussion that follows, those steps that can be performed by a user or a client side application are designated as "Client Side". Similarly, those steps that can be performed by a server side application or bot are designated as "Server Side".

Step 400 opts into a presence-based system for controlling a device. Examples of presence based systems are given above. This step can be performed in any suitable way. For example, a user can add a bot to their contact list as indicated above. Alternately or additionally, a user can opt into the system through an opt-in process for notifications on an instant messaging network.

Step 402 adds the user to the presence-based system for controlling a device. Step 404 interacts with the user. This step can be performed in any suitable way. Specifically, given the flexibility and access that the presence-based system provides to a wide variety of services, such interaction can take a wide variety of forms. For example, once the user has opted into the system, various events can occur that prompt the bot to interact with the user. For example, programming might be complete for a media service, such as media service 118, such that the user is notified. Alternately or additionally, new programming may be available or a watch list that a user has established for content, dates and programming may be implicated by having a program that meets its criteria played. This can also include, by way of example and not limitation: a bot looking for and purchasing selected programming on behalf of the user when a specified price point has been reached, and notifying the user of the purchase; a bot notifying the user of system status (disk full, only room for two more programs, hardware failure, software upgrades available that would enable new functionality, etc.); a bot that helps a user manage the synching of recorded or purchased media across multiple devices connected to the bot; an appropriately DRM-enabled bot enabling a user to transfer a purchased media file from one system to another system where, for example, the user might be on vacation; a bot that could help manage child safety viewing habits by being able to manage and notify parents of their child's viewing time and show content; a notification to a user when the bot has determined that some interesting pattern of media viewing has taken place within the social network of the user (e.g., more than 3 of the contacts on my contact list have watched a particular movie within the last 24 hours).

The events that are sent to the user can cause the user, at step 406, to open a conversation window to engage the bot. In this case, the conversation window might be opened by the user clicking on a particular UI button on a received notification or event. But one example of a conversation window is provided above.

Alternately or additionally, a user may proactively and without prompting by the bot, open a conversation window, at step 406, so that the user can interact with the bot. For example, a user may be at work and realize that a particular program of interest is going to be broadcast while they are still at work. In this case, the user can access their instant messaging application and click on the TVBuddy icon to open a conversation window with the bot. Once opened, the user can use the conversation window to remotely make their programming/recording selection.

Step 408 receives information from the bot pertaining to media that can be consumed by the user. This information can comprise any suitable type of information, examples of which are given above. In addition, this information can be received using any suitable techniques. For example, such information can be received via the conversation window that was opened in step 406. Alternately or additionally, the information can be received via an activity window, such as the one described above. The information that is received might, for example, be update information that keeps the user informed of the bot's success in accomplishing user-defined tasks (i.e. "successfully set to 'Record' Gonzaga basketball game"). Alternately or additionally, such information might be presented in the form of a menu or indication of options that are available for the user.

Step 410 responds to and interacts with the bot. This step can be performed in any suitable way. For example, the user might simply textually engage the bot in a conversation window. Alternately or additionally, the user might both conversationally engage the bot as well as engage an activity window to take some action. Examples of such actions include, by way of example and not limitation, scheduling the device to record a program, searching for programming to record, performing management functions on the device (deleting recorded programs, managing disk space, scheduling activities, reporting usage, viewing activity, etc.), setting up program reminders, setting up on-going programming searches, remotely viewing trailers of programs of interest or identified by the bot as being potentially of interest and the like.

As can be appreciated from the above discussion, using an application or bot in connection with a presence based network to enable a user to remotely access and interact with a device, such as a television or entertainment device, can provide the user with utilities and functionalities that greatly enhance the user's media consumption experience. Remote access enhances user convenience and provides a degree of flexibility that can permit the user to make programming choices and take related actions whenever they wish to, without requiring them to be physically present at the device.

It is to be appreciated and understood that any suitable application or bot can be utilized to provide the functionality described above, as will be appreciated by the skilled artisan. But one example of such a bot is provided just below.

Exemplary Application/Bot Implementation

Figure 5:
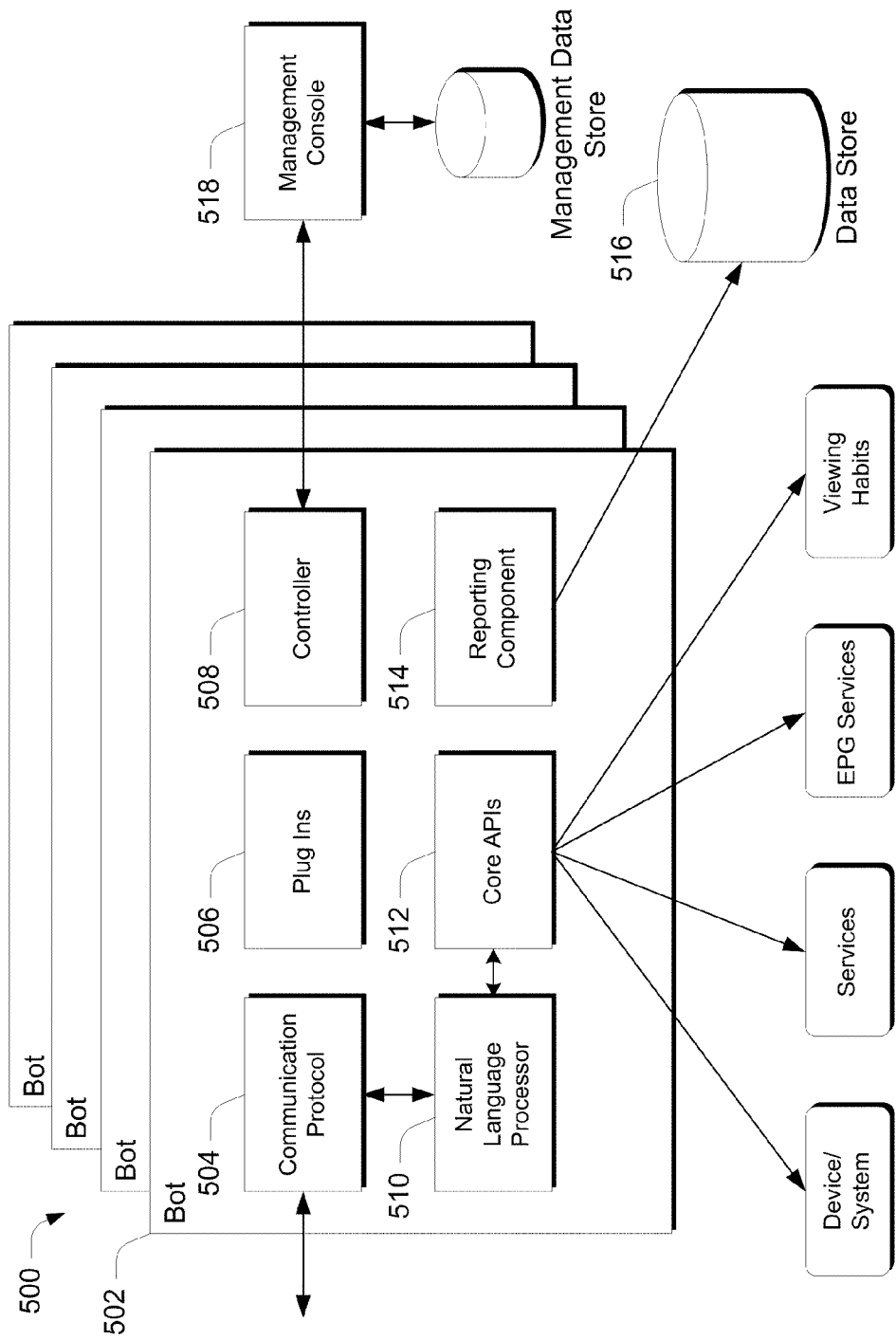
FIG. 5 illustrates a collection of bots in accordance with one embodiment.

FIG. 5 illustrates a collection of bots generally at 500, an example of which is specifically shown at 502 in accordance with one embodiment. In practice, individual servers in the presence based network can host a number of different bots and/or different types of bots. For example, such other different types can include, by way of example and not limitation, information retrieval bots (e.g., an MSN search bot, Encarta encyclopedia bot or shopping on Amazon.com like bot), a CRM bot (such as a support bot or a financial services bot that explains to existing customers different financial products that map to their financial position), an entertainment bot (playing word games, chatting, etc.), a product oriented bot (e.g., a bot that highlights the advantages of a particular product), and a personality bot (an example being a virtual DJ bot). The bots are typically implemented in software in the form of computer-readable instructions that reside on some type of computer-readable media.

In this example, bot 502 includes components that can implement the functionality described above. It is to be appreciated and understood that the specifically-illustrated bot constitutes but one exemplary bot that can implement the functionality described above. Accordingly, other bots can be utilized without departing from the spirit and scope of the claimed subject matter.

In this particular example, bot 502 includes, by way of example and not limitation, a communication protocol component 504, one or more plug in components 506, a controller component 508, a natural language processor 510, a core API component 512 and a reporting component 514 that utilizes a data store 516. A management console 518 is also provided.

Communication protocol component 504 is configured to communicate with the presence network and client application executing on the remote computing device. Component 504 handles all conversational aspects and capabilities. Any suitable communication protocol can be utilized. In the instant messaging embodiments, the protocol includes peer-to-peer capabilities.

Plug in components 506 can comprise any suitable components that provide additional functionality outside of the bot core. Examples can include, by way of example and not limitation, chat room support components, access to external data sources like flight reservation systems, public forums to access FAQs, gamer tag information such as that from Microsoft's Xbox Live, and the like.

Controller component 508 is configured to control and provide control functionality for bot 502. This can include communicating with a management console 518 to allow the bot to be programmed and reconfigured as desired. Controller component 508 can allow for bots to be started and stopped, track how many users are utilizing the presence network, show which plug ins are available and what services have been enabled to leverage with the core API component 512 discussed below.

Natural language processor 510 can comprise any suitable natural language processor. In some embodiments, the natural language processor is based on a scripted markup language which allows it to receive a request (as from communication protocol component 504) and then generate a response, as will be appreciated by the skilled artisan.

Core APIs 512 comprise a collection of APIs that are utilized to access or leverage outside services. That is, the core APIs 512 are configured to leverage available services by making and receiving programmatic calls to and from components that make up such services. For example, the core APIs can be used to access the user's device/system that is being programmed (using any suitable medium of communication), various other services (such as email and the like), EPG services, viewing habits services (such as those provided by media service 118 (FIG. 1)), and the like.

Reporting component 514 allows bot 502 to pass information to data store 516. This information can comprise any suitable type of information such as information about the bot's communication with various users, the various uses of the plug-ins, and the like.

In Operation

In operation, when a user engages a bot through, for example, an instant messaging application executing on their remote computing device, the user's communication (whether textual, VoIP, voice clips) is received via communication protocol 504 and processed by natural language processor 510. In some instances, the natural language processor may include or otherwise have access to the services of a text-to-speech and/or speech-to-text module. For example, if the user's communication is received in the form of a voice clip, then the natural language processor may utilize a speech-to-text module to translate the speech into text. Similarly, responses generated by the natural language processor may then be translated from text to speech and then sent to the user. Such modules are known and, for the sake of brevity, are not described in additional detail.

Once the natural language processor processes the user's communication, the core APIs can be leveraged to access the appropriate services in responding to the user. For example, if the user's communication indicates that the user wishes to remotely program or otherwise access their device, then the core APIs can be utilized to access the device. Alternately or additionally, if the user wishes to access EPG data to see which programs are available, then the core APIs can be utilized to access an appropriate EPG service. Further, if a user wishes to access their viewing habits or those of their contacts, then the core APIs can be utilized to access the viewing habits. This notion is explored in more detail below in the section entitled "Social Networking".

Social Networking

Because the presence network supports the notion of contacts, and because the network has access to services that can maintain users' viewing habits, a bot can have the ability to access the viewing habits of all of a user's contacts (assuming, of course, that a particular contact has elected to allow such access). This can provide the opportunity for a rich and robust sharing experience. For example, in some scenarios, a bot can show a particular user's contacts which movies that user is or will be watching in the future and vice versa. For example, a user may ask a bot "What is Bob watching now?" or "What movies is Bob going to watch this week?" By having access to Bob's viewing habit information, the bot can then reflect this information back to the user.

In at least some embodiments, this social networking functionality can be accessed in a couple of different ways. For example, in some scenarios, the user can simply engage the bot in a conversation, as in the example above. Alternately or additionally, the user can click on a web window that represents a contact which would then alert the bot to the fact that the user desires to learn some information about Bob's viewing habits. In this case, the bot can begin feeding information to the user or otherwise intelligently expose the user to other cross-referenced information. For example, the bot may provide a list of movies that Bob is scheduled to view and may then, responsive to this list, provide the user with a listing of movies that Bob may not necessarily be scheduled to view, but which share a genre of the movies that Bob is scheduled to view.

Hence, in this embodiment, the bot is employed as a context discovery mechanism in which the context of a user's contacts can be discovered in relation to their interaction with a service, such as a television or gaming service. This enables other users to discover their contacts' habits even when their contacts are offline.

Conclusion

Various embodiments described above utilize a real-time instant messaging or presence based communications service as a mechanism to control the operation, programming, and review of media content on a device or system such as a television, media center, gaming device, digital video recorder, mobile device for consuming media and the like.

In addition, the use of the instant messaging or presence based communication system opens up various social networking options for users. For example, users can, if allowed, gain access to the viewing habits of individuals in their contact list and exchange information with one another to provide a rich, robust sharing environment. Alternately or additionally, the user can publish their own viewing habits information, such as preferences, recommendations and the like.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
    establishing a communication session, using a presence based network, with an application executing on a client device, the establishing being performed in part by at least one or more interactive bots that include instructions executable by one or more processors on a presence server;
    utilizing the one or more interactive bots to engage in a human-like conversation with a user associated with the client device during the communication session, the human-like conversation interacting with the user via an interface conversation window when the application executing on the client device initiates an online presence;
    providing within the communication session, via the interface conversation window and the human-like conversation, a plurality of different consumption retrieval options associated with media consumption information for the user associated with the client device, wherein each consumption retrieval option is associated with a different approach to discovering media content to recommend to the user;
    receiving within the communication session, via the interface conversation window and the human-like conversation, a consumption retrieval selection in response to providing the plurality of different consumption retrieval options;
    employing the one or more interactive bots to discover a plurality of media consumption recommendations, wherein at least one media consumption recommendation is based on presence information of one or more contacts of the user;
    providing within the communication session, via an interface activity window to be displayed next to the interface conversation window, the plurality of media consumption recommendations;
    receiving within the communication session, via the interface activity window or the interface conversation window, a media consumption selection;
    purchasing the media consumption selection on behalf of the user of the application executing on the client device;
    providing a notification of the purchase of the media consumption selection; and
    programming a media consuming device to consume content associated with the media consumption selection.

2. The method as recited in claim 1, wherein the media consuming device is remote from the client device and programming the media consuming device includes instructing the media consuming device to record the content.

3. The method as recited in claim 1, wherein the one or more interactive bots reside as presence based contacts in a buddy list of the user of the application executing on the client device, and wherein the one or more interactive bots are online in the presence based network whenever the user is online.

4. The method as recited in claim 1, further comprising:
    receiving a request within the communication session, via the interface conversation window and the human-like conversation, for media consumption habits of a particular contact;
    accessing the media consumption habits of the particular contact responsive to receiving the request; and
    providing a response within the communication session, via the interface conversation window and the human-like conversation, indicating the media consumption habits of the particular contact.

5. The method as recited in claim 4, wherein the response is based at least in part on a current online presence of the particular contact identified in the request.

6. The method as recited in claim 1, wherein the human-like conversation includes textually engaging the one or more interactive bots using the interface conversation window implemented in an instant messaging program.

7. The method as recited in claim 1, further comprising employing the one or more interactive bots to implement safety viewing habits that manage the programming of the media consuming device.

8. The method as recited in claim 7, further comprising employing the one or more interactive bots to generate notifications to a third person based on the safety viewing habits.

9. A method comprising:
    establishing a communication session with a bot using a presence based network, the bot being an automated application that when executed on one or more processors implements an interface conversation window to engage in a human-like conversation with a user of a device;
    within the communication session:
        providing, via an interface conversation window and the human-like conversation, a plurality of different media content retrieval options based on a profile associated with the user of the device that established the communication session, wherein each media content retrieval option is associated with a different approach to discovering media content to recommend to the user;
        receiving, via the interface conversation window and the human-like conversation, a media content retrieval selection in response to providing the plurality of different media content retrieval options;
        discovering, using the presence based network, a plurality of media content recommendations based on the media content retrieval selection;
        displaying, in an interface activity window presented adjacent to the interface conversation window, the plurality of media content recommendations;
        receiving at least one media content selection;
        purchasing the at least one media content selection on behalf of the user of the device;
        providing a notification of the purchase of the at least one media content selection;
        utilizing the bot to program the device to consume media content associated with the at least one media content selection; and
        displaying, in the interface activity window, a layout schedule indicating starting times for the at least one media content selection.

10. The method as recited in claim 9, wherein utilizing the bot to program the device to consume the media content includes remotely programming the device to record the media content.

11. The method as recited in claim 9, wherein the bot resides as a presence based contact in a buddy list of the user.

12. The method as recited in claim 11, wherein the bot is always online in the presence based network.

13. The method as recited in claim 9, further comprising receiving a request for media consumption habits of a particular contact via the interface conversation window and the human-like conversation.

14. The method of claim 13, further comprising providing a response to the request via the interface conversation window or the interface activity window, the response including the media consumption habits of the particular contact.

15. A system comprising:
one or more processors;
one or more memories storing instructions that, when executed on the one or more processors, configure the system to:
establish a communication session, using a presence based network, with an application executing on a client device;
utilize one or more interactive bots to engage in a human-like conversation with a user associated with the client device during the communication session, the human-like conversation interacting with the user via an interface conversation window when the application executing on the client device initiates an online presence;
provide within the communication session, via the interface conversation window and the human-like conversation, a plurality of media retrieval options for the user associated with the client device;
receive within the communication session, via the interface conversation window and the human-like conversation, a media retrieval selection in response to providing the plurality of media retrieval options;
employ the one or more interactive bots to discover a plurality of media content recommendations, wherein at least one media content recommendation is based on presence information of one or more contacts of the user;
provide within the communication session, via an interface activity window to be displayed next to the interface conversation window, the plurality of media content recommendations;
receive within the communication session, via the interface activity window or the interface conversation window, a media content selection;
purchase the media content selection on behalf of the user of the application executing on the client device;
provide a notification of the purchase of the media content selection; and
program a media consuming device to consume the media content selection.

16. The system as recited in claim 15, wherein the media consuming device is remote from the client device and programming the media consuming device includes instructing the media consuming device to record media content.

17. The system as recited in claim 15, wherein the one or more interactive bots reside as presence based contacts in a buddy list of the user of the application executing on the client device, and wherein the one or more interactive bots are online in the presence based network whenever the user is online.

18. The system as recited in claim 15, wherein the one or more memories store further instructions that, when executed on the one or more processors, configure the system to:
receive a request within the communication session, via the interface conversation window and the human-like conversation, for media consumption habits of a particular contact;
access the media consumption habits of the particular contact responsive to receiving the request; and
provide a response within the communication session, via the interface conversation window and the human-like conversation, indicating the media consumption habits of the particular contact.

\* \* \* \* \*